United States Patent [19]
Baxter et al.

[11] Patent Number: 5,515,126
[45] Date of Patent: May 7, 1996

[54] CONVERTIBLE FLASH CAMERA AND METHOD

[75] Inventors: Dennis E. Baxter, E. Rochester; Anthony DiRisio; John K. McBride, both of Rochester, all of N.Y.

[73] Assignee: Eastman Kodak Company, Rochester, N.Y.

[21] Appl. No.: 314,032

[22] Filed: Sep. 28, 1994

[51] Int. Cl.⁶ ................................................. G03B 15/03
[52] U.S. Cl. ...................................... 354/149.11; 354/288
[58] Field of Search ............................... 354/132, 149.1, 354/149.11, 288

[56] References Cited

U.S. PATENT DOCUMENTS

| | | | |
|---|---|---|---|
| 3,273,479 | 9/1966 | Jakob | 95/11 |
| 3,882,514 | 5/1975 | Graham | 354/149.1 |
| 4,350,420 | 9/1982 | Englesmann et al. | 354/145.1 |
| 4,415,247 | 11/1983 | Takematsu | 354/149.11 |
| 4,557,571 | 12/1985 | Reibl | 354/149.11 |
| 4,690,531 | 9/1987 | Hansen et al. | 354/149.11 |
| 4,734,733 | 3/1988 | Clapp et al. | 354/414 |
| 4,847,647 | 7/1989 | Ueda | |
| 4,893,139 | 1/1990 | Alligood et al. | 354/149.1 |
| 4,983,999 | 1/1991 | Meisezahl et al. | 354/149.11 |
| 5,023,639 | 6/1991 | Ushiro et al. | 354/132 |
| 5,066,967 | 11/1991 | Yamamoto et al. | 354/149.11 |
| 5,084,721 | 1/1992 | Burnham | |
| 5,146,252 | 9/1992 | Burnham | 354/149.11 |
| 5,202,719 | 4/1993 | Taniguchi et al. | 354/413 |
| 5,231,436 | 7/1993 | Glogan et al. | 354/149.11 |
| 5,255,033 | 10/1993 | Dassero | 354/149.11 |

FOREIGN PATENT DOCUMENTS

GB2230102A 10/1990 United Kingdom
GB2270997A 3/1994 United Kingdom

*Primary Examiner*—Michael L. Gellner
*Assistant Examiner*—Eddie C. Lee
*Attorney, Agent, or Firm*—David A. Howley; J. Addison Mathews

[57] ABSTRACT

A camera is provided with alternative mounting structures, one for an extensible flash and another for a fixed flash. One of the mounting structures is used for securing and aligning a selected alternative extensible or fixed flash device. The other is covered by a camera casing. The casing defines first and second apertures aligned with the first and second mounting structures, respectively. The first aperture provides access through the casing for mounting the extensible flash assembly on the first mounting structure and the second aperture permits passage through the casing of illumination from the fixed flash assembly.

A method of assembling a photographic camera also is provided including the steps of assembling alternative extensible and fixed flash assemblies; forming a core including alternative flash mounting structures corresponding to and adapted to receive the respective flash assemblies; coupling a selected one of the flash assemblies to the corresponding mounting structure; and covering the core with a camera casing.

7 Claims, 3 Drawing Sheets

CONVERTIBLE FLASH CAMERA AND METHOD

BACKGROUND OF THE INVENTION

1. Field of Invention

The invention relates to photographic cameras with flash devices, and more specifically to a camera and method of assembly including a permanent electronic flash selected from alternative designs.

2. Description of the Prior Art

It is common in modern photography to provide automated cameras with electronic flash devices. Many flash designs are available, including flash tube and reflector assemblies that are either fixed or extensible relative to the remainder of the camera.

The fixed flash approach has relatively few required parts, is simple to manufacture and easy to use. In compact cameras, however, space is limited, and the flash tube and reflector assembly are only a short distance from the camera optics. With certain photographic subjects this short distance can produce a phenomena known as red eye. Light is reflected from blood vessels in the subject's retina, which then image as red spots in the resulting picture.

Extensible flash devices solve the red eye problem by extending the flash tube and reflector assembly during picture taking to increase the distance of the flash assembly from the camera optics. In one popular approach, often called a cobra flash, the flash tube and reflector assembly is mounted on the camera body for pivotal movement between a collapsed position covering the optics and an extended position, above the camera, for picture taking. Extensible flash devices provide a good solution to the red eye problem, but add complexity to the camera and its manufacture and operation.

PROBLEM SOLVED BY THE INVENTION

Red eye is not a concern for all individuals or in all regions of the world. Certain eye characteristics, particularly dark eye colors, seldom produce red eye. Consumers having these characteristics are less inclined to purchase cameras with features aimed primarily at red eye reduction.

Camera manufacturers distributing worldwide, or to a diverse population, typically provide both fixed and extensible flash designs. Fixed flash may be preferred by individuals and in regions where red eye is not a concern. Extensible flash will be demanded by other individuals and in other regions. Unique parts, assembly procedures, distribution approaches and marketing strategies are required for each design.

SUMMARY OF THE INVENTION

The present invention is directed to overcoming one or more of the problems set forth above. Briefly summarized, according to one aspect of the invention, a camera is provided with alternative mounting structures, one for an extensible flash and another for a fixed flash. One of the mounting structures is used for securing and aligning a selected alternative extensible or fixed flash device. The other is covered by the camera casing.

According to more specific features, the casing defines first and second apertures aligned with the first and second mounting structures, respectively. The first aperture provides access through the casing for mounting the extensible flash assembly and the second aperture permits passage through the casing of illumination from the fixed flash assembly.

The invention includes a method of assembling a photographic camera including the steps of assembling alternative extensible and fixed flash assemblies; forming a core including alternative flash mounting structures corresponding to and adapted to receive the respective flash assemblies; coupling a selected one of the flash assemblies to the corresponding mounting structure; and covering the core with a camera casing.

The invention simplifies camera design and manufacture with common elements, including electronics, flash tubes, reflector assemblies, casings and covers, for both fixed and extensible flash approaches. A single camera core is suitable for manufacture in all regions, whether or not red eye is a concern. In regions known for a diverse population, the assembly process can switch between designs with little interruption or loss of efficiency. Decisions regarding flash type can be delayed until late in the manufacturing process when requirements are more certain.

These and other features and advantages of the invention will be more clearly understood and appreciated from a review of the following detailed description of the preferred embodiments and appended claims, and by reference to the accompanying drawings.

DESCRIPTION OF THE PREFERRED

Figure 1:
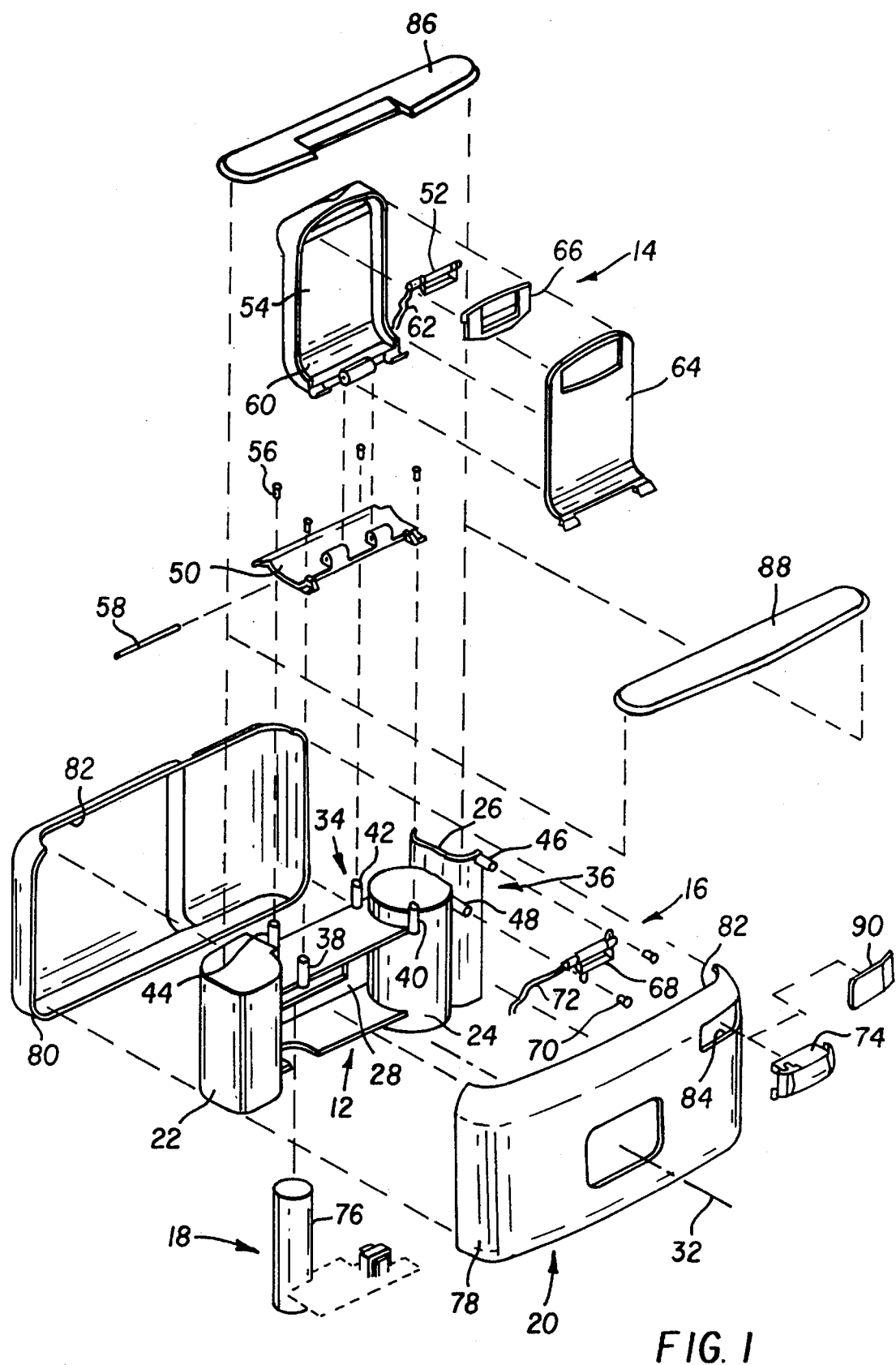
FIG. 1 is an exploded view of camera elements including alternative flash designs, one having an extensible flash and another having a fixed flash, according to a preferred embodiment of the invention.

Referring now to the drawings, a preferred embodiment of the invention is depicted in a photographic camera having a core 12, a permanent flash device selected from extensible and fixed flash alternatives 14 and 16, respectively, a flash circuit board 18 and a camera casing 20.

Figure 2:
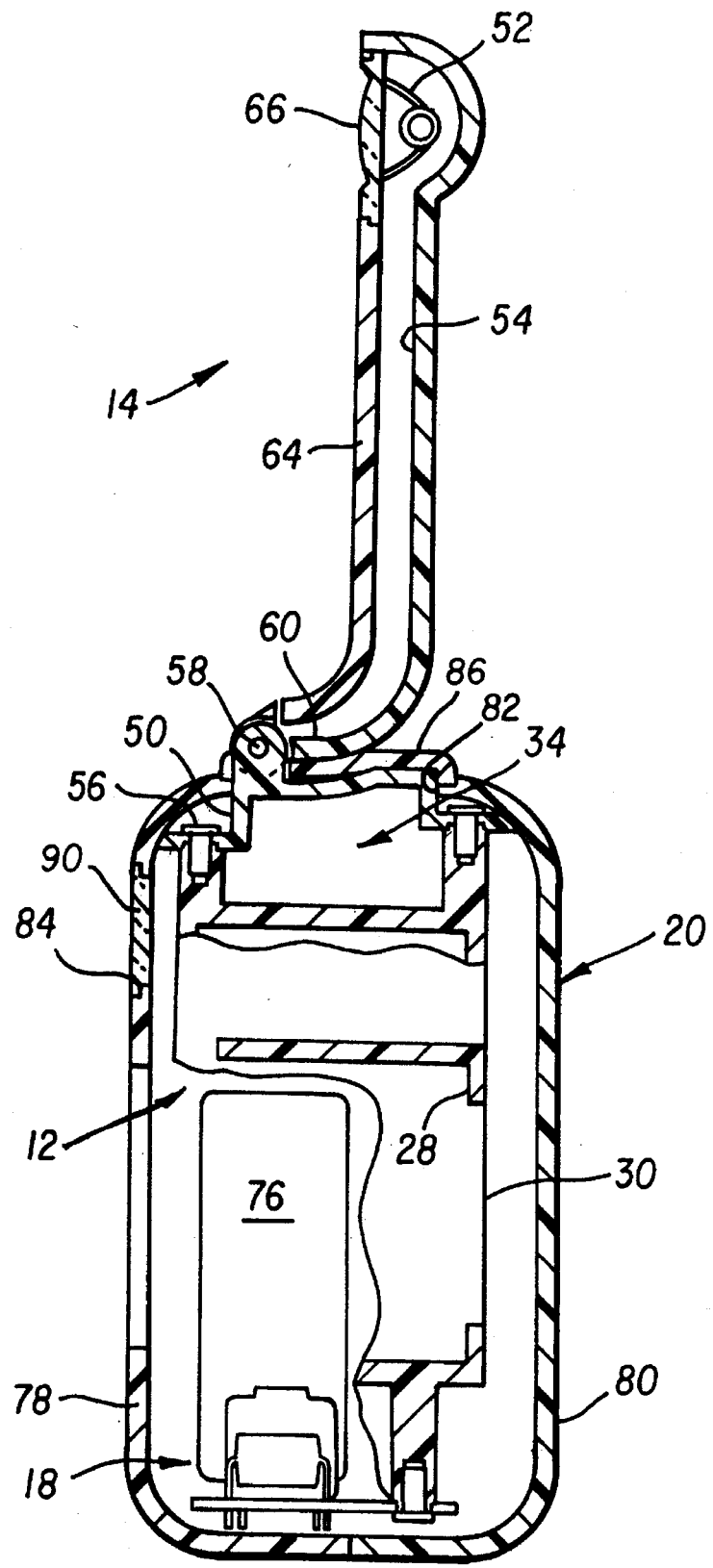
FIG. 2 is a cross-sectional view of the camera of FIG. 1 configured with an extensible flash.
Figure 3:
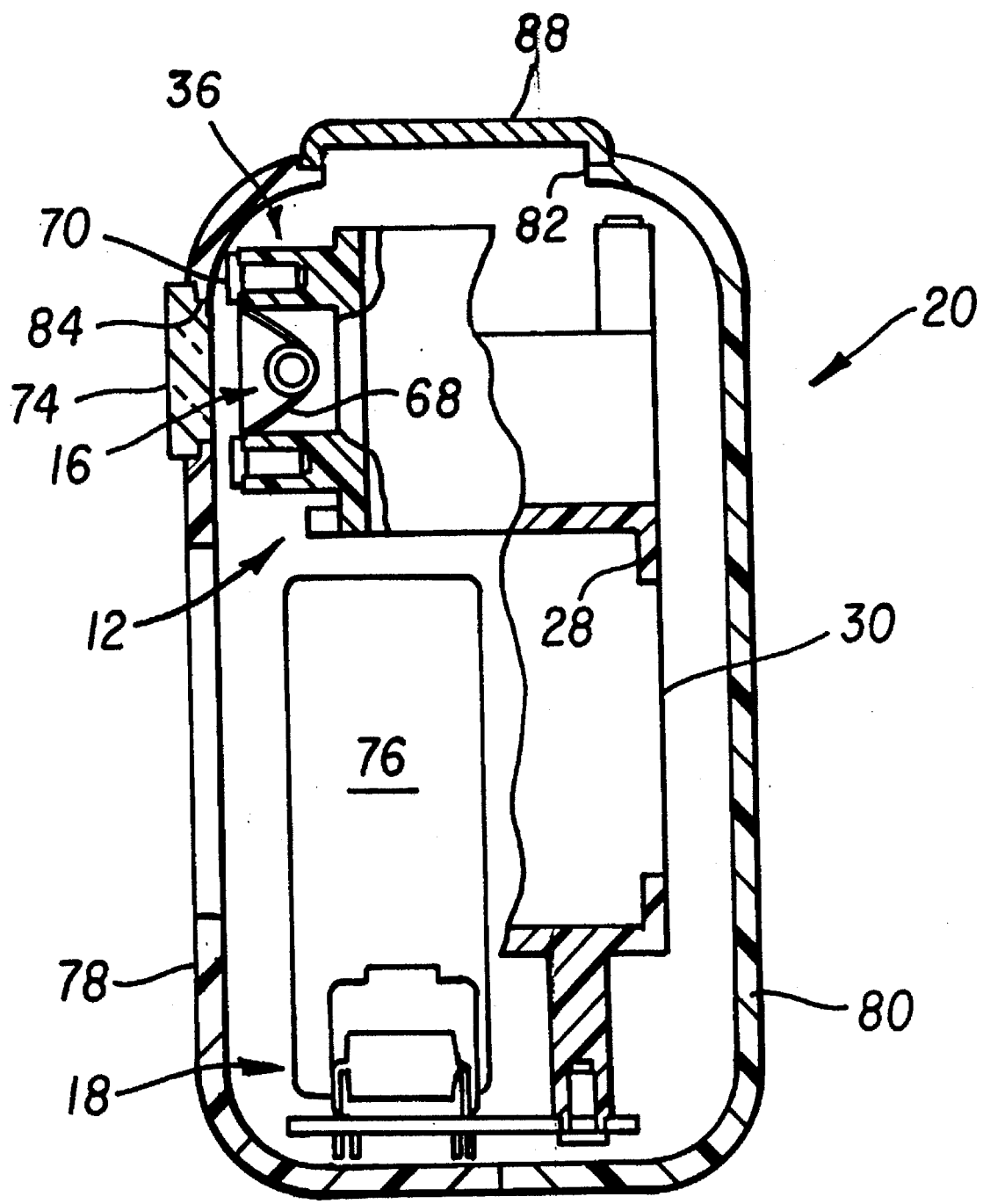
FIG. 3 is a cross-sectional view of the camera of FIG. 1 configured with a fixed flash.

Core 12, in this preferred embodiment, is a molded plastic frame defining compartments and supports for numerous camera elements. The compartments include film supply and take-up chambers 22 and 24, a battery compartment 26 and an exposure box 28. The exposure box 28 extends between the film chambers 22 and 24 and between front and back camera sections. Box 28 accommodates the camera optics in the front camera section and defines an unobstructed path from the optics to an exposure plane 30 (FIGS. 2 and 3) in the back camera section. At the exposure plane 30, flat surfaces of the exposure box 28 support and locate the film between the supply and take-up chambers 22 and 24. In operation, film is exposed to images focused at the exposure plane by the camera optics, centered along optical axis 32. Between each exposure, the film is advanced to move sequentially from the supply chamber 22 to the take-up chamber 24. In this preferred embodiment, the cartridge is located in the supply chamber 22, advanced from the supply chamber to the take-up chamber when the film is exposed, and then rewound into the cartridge for removal from the camera. Other suitable approaches include rewind cameras, such as single use cameras, where the film is prewound by the camera manufacturer from the film cartridge into a supply chamber. Then, during the exposure sequences, the film is returned to the film cartridge.

Core 12 also defines first and second alternative flash mounting structures 34 and 36, respectively, for aligning and supporting the alternative flash devices 14 and 16. First flash mounting structure 34 is located in the top camera section above exposure box 28 and generally horizontal, as shown in FIG. 1, or normal to exposure plane 30. The structure 34 includes a plurality of bosses 38, 40, 42, and 44 adapted to attach an extensible flash permanently to the core with appropriate surfaces, such as the top boss surfaces, establishing the proper flash orientation relative to optical axis 32. Second flash mounting structure 36 is somewhat similar, but is located in a front camera section facing forward and generally parallel to exposure plane 30 or normal to the first mounting structure 34. Structure 36 includes a plurality of bosses 46 and 48 adapted for permanent attachment of a fixed flash device properly aligned relative to the optical axis 32.

Extensible flash device 14 is a cobra flash device including a base mounting plate 50 that pivotally supports a flash tube and reflector assembly 52 in a head section 54. The base mounting plate 50 is adapted for mounting on bosses 38, 40, 42, and 44 of the first flash mounting structure 34 so the flash tube and reflector assembly will be properly aligned relative to the rest of the camera. Pins, screws or other appropriate fasteners 56 secure the mounting plate to the bosses in a manner intended to be permanent. Head section 54 is coupled to the base mounting plate 50 by a pivot pin 58 toward the front of the base mounting plate 50. When the base mounting plate 50 is attached to the camera, the pivot pin 58 is located adjacent the top and front of the camera. The head section 54 has a cooperating offset 60 that facilitates movement of the head section, with its flash tube and reflector assembly, between a closed position flat against the front of the camera, covering the camera optics, and an extended position above the camera. In the extended position, offset 60 rests against the camera casing 20, actually an inlay to be described hereinafter, and supports the head section 54 with the flash tube and reflector assembly essentially parallel to the optical axis 32. Flexible electrical connector 62 runs through the head section behind a flash head cover 64 with sufficient additional length for connection to the flash capacitor 76 or circuit board 18. A flash lens 66 also may be provided to cover the flash tube and direct its illumination as desired.

Fixed flash device 16 is a relatively simple structure including a flash tube and reflector assembly 68 with surfaces on the reflector adapted to mate with the core to properly align the fixed assembly relative to the rest of the camera. Pins, screws or other appropriate fasteners 70 secure the assembly 68 to the bosses 46 and 48 in a manner intended to be permanent. Flexible electrical connector 72 runs from the fixed flash assembly with sufficient additional length for connection to the flash circuit board 18. A flash lens 74 may be provided to cover the flash tube and direct its illumination as desired.

As already mentioned, a selected one of the extensible and fixed flash devices is mounted permanently on the core 12. Flash circuit board 18 is adapted for use with either flash device and includes a flash capacitor 76 for storing the required electrical energy from batteries in compartment 26. The circuit board is received in a recessed area of the core and then is coupled electrically to the flash device through electrical connector 62 or 72.

Camera casing 20 includes front and back sections 78 and 80 that fit together to surround and enclose the core 12. The casing 20 has apertures 82 and 84, respectively, aligned with the first and second flash mounting structures 34 and 36. Aperture 82 is defined between the front and back casing sections 78 and 80 and is aligned with the first flash mounting structure 34 to provide access through the casing for mounting the extensible flash assembly 14 on the first mounting structure. Aperture 84 is defined by a cut out or opening in the front camera section and is aligned with the second flash mounting structure 36 to permit passage through the casing of illumination from the fixed flash assembly.

The casing includes covers or inlays 86 and 88 and a plug 90. Cover 86 is used with the extensible flash 14 and closes and finishes the top of the casing while also covering the base mounting plate 50. Cover 88 is an alternative inlay that closes the aperture 82 when the fixed flash is selected and the extensible flash is omitted. Plug 90 fills the aperture 84 when the extensible flash is selected and the fixed flash is omitted. The casing 20 and inlays 86 or 88 and plug 90 thus cover the core and the mounting structure corresponding to the flash that is not selected.

The invention also encompasses a method of assembling a photographic camera including the steps of forming alternative flash assemblies including one having an extensible flash tube and reflector assembly and another having a fixed flash tube and reflector assembly; forming a core including alternative flash mounting structures, one corresponding to and adapted to receive the extensible assembly and another corresponding to and adapted to receive the fixed assembly; coupling a selected one of the extensible and fixed flash assemblies to the mounting structure corresponding to the selected assembly; and covering the core and non-selected mounting structure with a camera casing.

While the invention is described in connection with a preferred embodiment, other modifications and applications will occur to those skilled in the art. The claims should by interpreted to fairly cover all such modifications and applications within the true spirit and scope of the invention.

PARTS LIST FOR FIGURES

Reference No.
12. Core.
14. Extensible flash alternative.
16. Fixed flash alternative.
18. Flash circuit board.
20. Camera casing.
22. Film supply chamber.
24. Film take-up chamber.
26. Battery compartment.
28. Exposure box.
30. Exposure plane.
32. Optical axis.
34. First alternative flash mounting structure.
36. Second alternative flash mounting structure.
38, 40, 42 and 44. First flash mounting bosses.
46 and 48. Second flash mounting bosses.
50. Base mounting plate.
52. Flash tube and reflector assembly.
54. Head section.
56. Fasteners.
58. Pivot pin.
60. Offset.
62. Electrical connector.
64. Flash head cover.
66. Flash lens.

68. Flash tube and reflector assembly.
70. Fasteners.
72. Electrical connector.
74. Flash lens.
76. Flash capacitor.
78. Front casing section.
80. Back casing section.
82. Aperture.
84. Aperture.
86. Cover inlay.
88. Cover inlay.
90. Plug.

What is claimed is:

1. A photographic camera for use with a selected one of a plurality of flash devices, one flash device including an extensible flash tube and reflector assembly and another flash device including a fixed flash tube and reflector assembly, said camera having an optical axis and comprising:

first flash mounting structure adapted to align and secure the extensible flash device in a first predetermined position relative to the optical axis;

second flash mounting structure adapted to align and secure the fixed flash device in a second predetermined position relative to the optical axis; and, a casing including an aperture aligned with a selected one of the first and second mounting structures for accommodating the selected flash device, said casing covering the mounting structure not selected such that said photographic camera cannot be used with the non-selected flash device.

2. The invention of claim 1, wherein said camera defines a top section and a front section generally normal to said top section, said top section including said first flash mounting structure and said front section including said second flash mounting structure.

3. A camera including a flash tube and reflector assembly selected alternatively from an extensible assembly and a fixed assembly; said camera comprising:

a core;

first flash mounting structure on said core and securing the selected flash assembly permanently to said core;

second flash mounting structure on said core adapted to receive the non-selected flash assembly; and, a casing covering said core and said second mounting structure such that said camera cannot be used with the non-selected flash assembly.

4. The invention of claim 3, wherein said casing includes an aperture aligned with said first flash mounting structure for accommodating the selected flash assembly.

5. A camera for exposing photographic film and comprising:

a core including a film chamber and means defining an exposure plane for receiving and exposing the film;

cobra flash mounting structure on said core adapted to receive and secure a cobra flash device to said core;

fixed flash mounting structure on said core adapted to receive and secure a fixed flash device to said core;, a flash device permanently secured to a selected one of said cobra and fixed flash mounting structures;

a casing covering said core, said casing accommodating said permanently secured flash device and enclosing said mounting structure not selected such that said camera can be used with only said permanently secured flash device.

6. A photographic camera having a permanent flash device selected alternatively from a first set of extendible flash devices each having a reflector housing pivoted on a base plate and a second set of fixed flash devices each having a reflector; said camera comprising:

a core having mounting structure attaching and aligning the permanent flash device relative to said core, said mounting structure including first supporting surfaces adapted to receive a flash device from the extendible set and second surfaces distinct from said first surfaces adapted to receive a flash device from the fixed set;

a casing covering said core, said casing defining a first opening providing access to said first surfaces for mounting the flash from the extendible set and a second opening adjacent said second surfaces for passing illumination through said casing from a flash device in the fixed set;

a cover over a selected one of said first and second openings such that said photographic camera can be used with only said permanent flash device.

7. A method of assembling a photographic camera; said method comprising;

forming an extensible flash tube and reflector assembly;

forming a fixed flash tube and reflector assembly;

forming a core including a first flash mounting structure adapted to receive said extensible assembly and a second flash mounting structure adapted to receive said fixed assembly;

coupling a flash circuit board to said core, said circuit board including a flash capacitor;

selecting an alternative one of said extensible and fixed flash assemblies;

coupling said selected flash assembly to said flash circuit board and to the one of said first and second flash mounting structures adapted to receive the selected flash assembly;

covering said core with a camera casing defining first and second apertures aligned with said first and second mounting structures, respectively, said first aperture providing access through said casing for mounting said extensible flash assembly on said first mounting structure and said second aperture permitting passage through said casing of illumination from said fixed flash assembly; and, covering said first aperture when said selected flash assembly is said fixed flash assembly such that said photographic camera cannot be used with said extensible flash assembly.

* * * * *